Patented Nov. 12, 1929

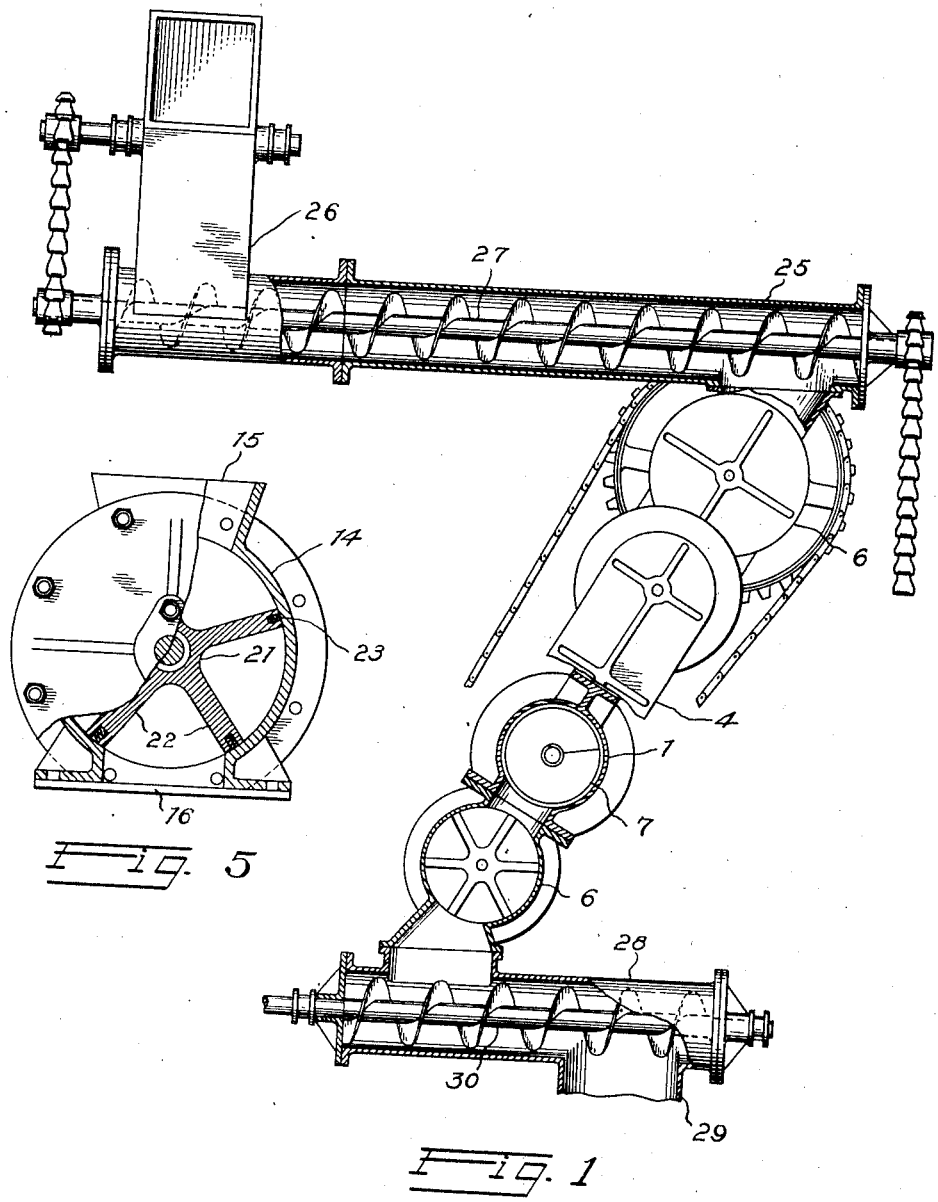

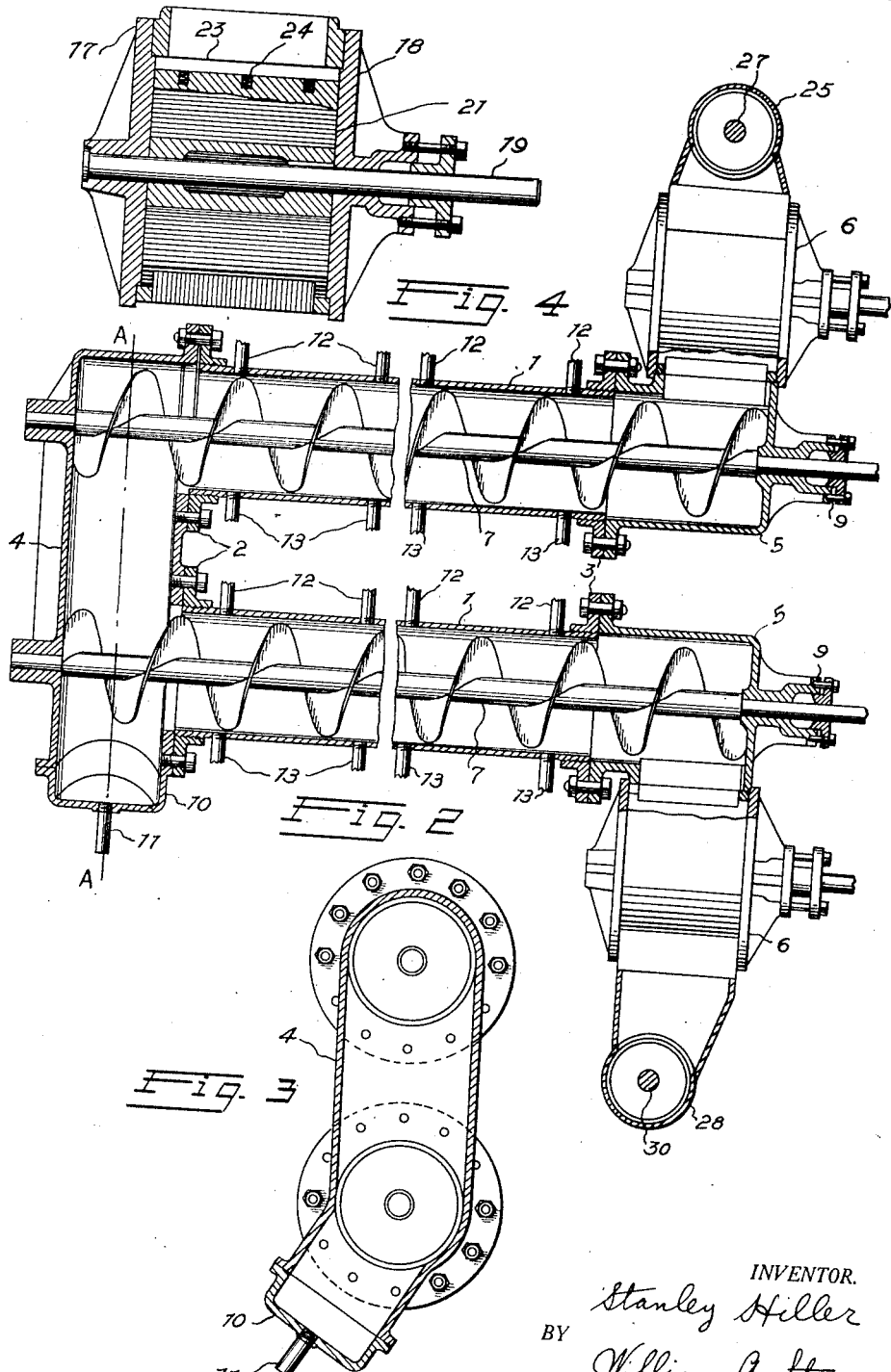

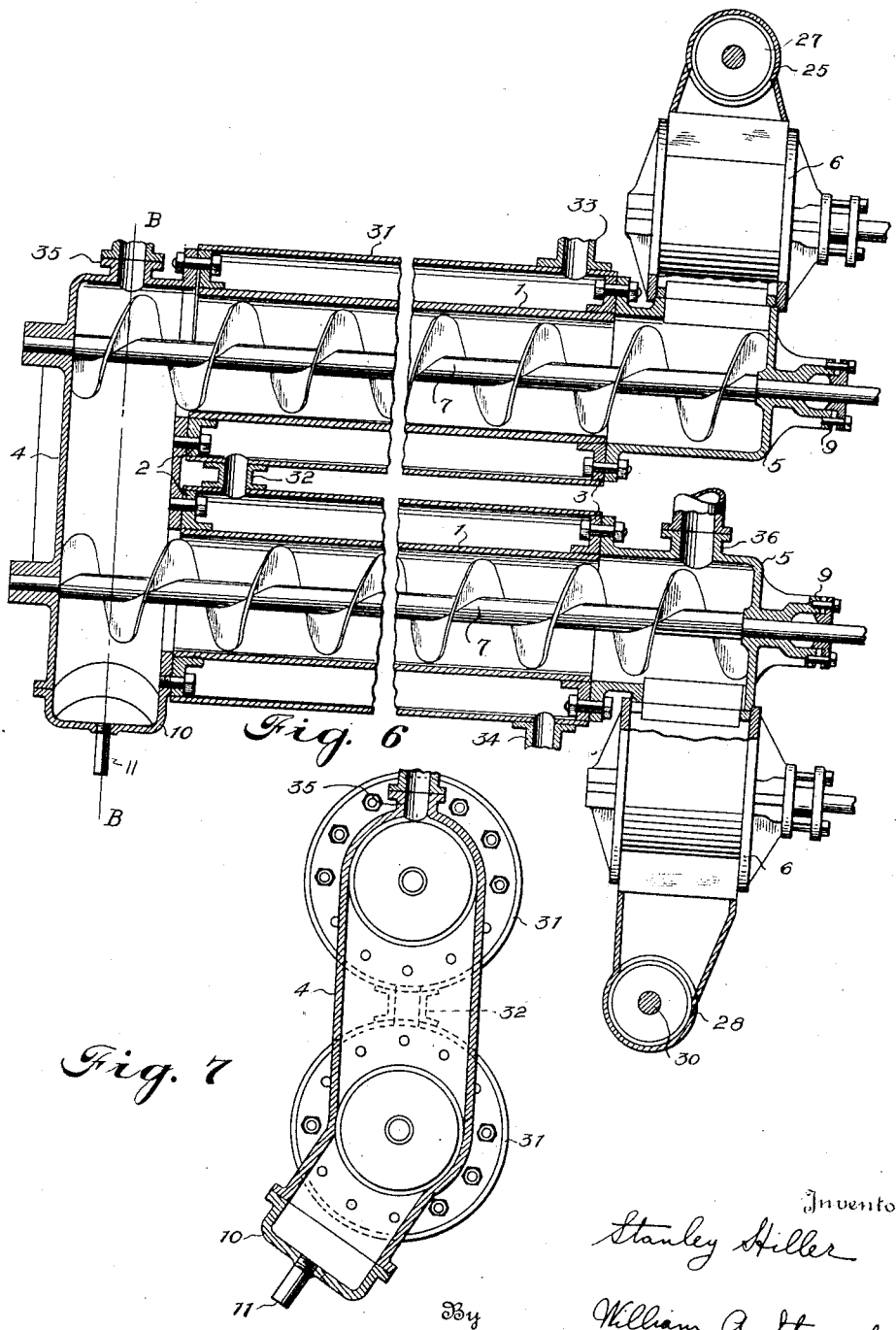

1,735,392

UNITED STATES PATENT OFFICE

STANLEY HILLER, OF SAN JOSE, CALIFORNIA, ASSIGNOR TO STANLEY HILLER, INC., OF SAN FRANCISCO, CALIFORNIA

APPARATUS FOR COOKING MATERIALS

Application filed August 6, 1923. Serial No. 656,095.

This invention relates to an apparatus for cooking materials.

More particularly, the invention relates to an apparatus for cooking fish, fish waste, seeds, vegetables and the like materials.

In cooking processes such as disclosed in co-pending application Serial Number 630,041, filed April 5, 1923, and Patent No. 1,489,940, wherein materials are cooked under pressure in direct contact with live steam, it is found that the condensation of the steam forms relatively large quantities of water, especially for materials requiring long cooking. A certain portion of the solid matter in the fish goes into solution in the water so formed, is carried off in the overflow and is lost. The loss of the solid matter in this manner increases with the amount of water introduced to cook the fish, and is minimized by reducing the amount of water used.

It further appears that certain of the substances which enter into solution, for example the albuminous matters, may be fixed by introducing a heat sufficiently high at the beginning of the cooking so that these soluble substances are congealed, and thereafter will not enter into solution with the water if the cooking steam condenses and the material being cooked is cooled.

Objects of the present invention are to minimize the above mentioned losses, to reduce the amount of water used and thereby increase press and dryer efficiency; and to fix soluble substance to prevent solution and loss thereof. These objects are accomplished as follows. The steam is superheated before being forced into the cooker, the temperature being increased from about 230° F. to 400° F. or higher. This superheated steam is then fed at different points along the cooker in a manner to first congeal the albuminous substances and thereafter to maintain a high cooking temperature and pressure with a minimum condensation.

In apparatus such as set forth in co-pending application Serial Number 630,041 it is found that steam under pressure escapes in the pockets of the cooker feed and discharge valves. This steam has been wasted, and at the feed valve tends to cause spitting of the materials. A further object of the invention is to utilize this waste steam and prevent spitting. This object is accomplished by providing inclosed feed and discharge conveyors carrying the material to the feed valve and away from the discharge valve into which the waste steam is forced. In the feed conveyor the waste steam is utilized to pre-cook the material, and in the discharge conveyor the waste steam is utilized to further heat and cook the material.

Further objects of the invention are to provide an apparatus for cooking in which a maximum efficiency at a minimum cost is attained, and such other objects as will appear hereinafter in the detailed description.

Referring to the drawings

Figure 1 is an end view of the apparatus partially in section.

Figure 2 is a side view of a portion of the apparatus partially in section.

Figure 3 is a sectional view taken along line AA of Figure 2.

Figure 4 is a sectional elevation of the valve wheel showing the valve structure.

Figure 5 is an end elevation, partially in section of the valve.

Fig. 6 is a side view partially in section showing a portion of a modified form of apparatus.

Fig. 7 is a sectional view taken along line B—B of Fig. 6.

The body portion of the cooker comprises cast sections 1 to which are secured flanges 2 and 3. Bolted to flanges 2, is an end piece 4 which forms a connection through which material passes from the upper to the lower section 1 of the cooker. Secured to flanges 3 are end pieces 5. Valves 6 are bolted to end pieces 5. Journaled in bearings formed in end pieces 4 and 5 are feed screws 7. Provision is made for driving screws 7 as shown in my Patent 1,489,940 or in any well known manner. Stuffing boxes 9 are provided to maintain pressure tight driving journals.

End piece 4 is provided with a recessed section or sump (Figure 3) to which is secured a removable bottom piece 10. A drain pipe 11 is provided to draw off liquid that may accumulate in the sump. Pipes 12 and 13 are provided for the admission and exhaust of steam at different points along the cooker body.

Valves 6 comprise a body portion 14 with openings 15 and 16. To 14 are secured end pieces 17 and 18. Journaled in 17 and 18 is a spindle 19. Rigidly secured to 19 is a valve or star wheel 21 with a plurality of vanes 22. In slots in each vane, a packing member 23 is set. Packing members 23 are pressed outwardly against 14 by springs 24 to form pressure tight valve joints. The vanes are so arranged that there will always be at least two members 23 in each valve sealing the cooker to maintain a difference of pressure therein. It will of course be understood that the cooker may be operated at a pressure below atmospheric pressure as well as above for certain kinds of cooking. Check valves may be provided in pipes 11, 12 and 13 to maintain any desired pressure in the cooker. It will furthermore be understood that any means of generating superheated steam for the cooker may be adopted. For example steam may be generated or superheated in coils placed in the drier combustion chamber shown in Patent 1,489,940 or in an auxiliary plant as desired.

Communicating with the upper or feed valve 6 of the cooker is an inclosed feed conveyor chamber 25 at the opposite end of which is a hopper 26. The chamber 25 has suitably journaled therein a feed screw 27. Communicating with the lower or discharge valve 6 is an inclosed discharge conveyor chamber 28 provided with a discharge opening 29 and having a discharge screw 30 suitably journaled therein. The screws 27 and 30 may be driven as disclosed in my Patent 1,489,940, the present invention being particularly useful in the plant therein shown.

*Operation*

In operation the material to be cooked is fed into hopper 26 and is then carried by screw 27 through 25 to feed valve 6. Valve 6 is rotated to pass the material into upper cooker section 1 without permitting a substantial variation of the pressure in the cooker. As valve 6 rotates steam under pressure is carried around by the pockets of the star wheel and is discharged into 25 heating up the material therein. The pressure of screw 27 on the material prevents spitting as the steam is released from the valve pockets and the material is in this manner preheated.

After the material is passed into the cooker it is picked up by upper feed screw 7 and carried along until it drops through end section 4 to the lower feed screw 7. All heavy foreign objects will drop to the bottom of the sump where they may then be collected, and lower screw 7 carries the material to discharge valve 6. The discharge valve is rotated and passes the cooked materials into conveyor chamber 28 where it is picked up by screw 30 and carried to the discharge opening 29. As the discharge valve is rotated steam under pressure is carried out of the cooker in the valve pockets and enters chamber 28 where it is utilized to heat the cooked materials. It will be understood that the feed and discharge conveyors, valves and cooker screws may be so timed relatively that a continuous feed and cooking of material is attained. When materials are being cooked which require relatively long cooking, the speed of operation of the combination as a whole is slowed up as fully disclosed in the co-pending applications.

Live superheated steam is admitted through pipes 12 and 13 in sufficient quantities and at proper pressure to thoroughly cook the particular material. Admission of the highly superheated steam at the feed end of the cooker tends to congeal soluble albuminous substances and render them insoluble thereafter. Admission of the superheated steam at a plurality of points results in a more thorough cooking of the material and a higher grade product with a minimum condensation of the steam. The addition of water is highly undesirable in certain classes of cooking, for example where material such as fish is to be treated for the manufacture of meal and extraction of oil. In plants of this character the yield of meal decreases with the increased quantities of water, and the efficiency of presses and driers is decreased, while the cost of steam generation increases. A considerable increase in yield and lowering of costs results in the proper application of the present process due to the reduction in amount of condensation. By properly regulating the degree of superheating and the admission of steam at the various points the process may be perfected to the point where little or no water is added during cooking for a given material. It will of course be understood that the entire cooking apparatus may be jacketed with heat insulating material to prevent radiation of heat therefrom in well known manner. Furthermore a jacket may be provided for the cooker body into which the hot gases from a drier or furnace may be passed before being permitted to escape up the stack, or into which superheated steam may be passed. It will also be understood that the cooker may be operated as a vacuum cooker when so jacketed for certain classes of cooking.

The vacuum form of jacketed apparatus is shown in Figures 6 and 7. In this form steam inlets and exhaust pipes 12 and 13 are naturally eliminated and any simple method of forming a jacket for sections 1 of the cooker may be used, the most convenient being the application of cylindrical jackets 31 supported from flanges 2 and 3, as shown. A suitable connection 32 may be provided between jackets 31 to permit the passage of the heating medium, although if desired, the jackets may be independent and have separate inlets and outlets for the gas, steam, or other heating medium. Suitable inlet and outlet connections 33 and 34 are also provided for the heating medium. As shown, the heating medium may be admitted through connection 33, will pass around the upper body 1 to the left, through connection 32, then through the lower jacket 1 to the right, and out through connection 34. Or if desired, 34 may be used as the inlet, and 33 as the outlet for the heating medium.

To maintain a vacuum in the cooker body, connections 35 and 36 are formed in end piece 4 and lower end teeth 5, which in turn may be connected by suitable piping to a vacuum head or chamber (not shown) in which a suction is created by pumps or in any well known manner.

In operation of the vacuum cooker or evaporator, the material is continuously passed through the cooker in the same manner as set forth for the pressure cooker. Foreign articles will collect in sump 10 and the free liquids will be drained off through connection 11. As the material passes through the cooker it is heated due to the action of the heating medium surrounding bodies 1, and the moisture is driven off. The gases generated are continually drawn out through the connections 35 and 36, and because of the seals effected by the valves 6, a high degree of vacuum may be continuously maintained while the feeding of materials into and out of the cooker or evaporator proceeds continuously. It is to be noted when handling large quantities of material, the feed and discharge conveyors further help to maintain the seal. The discharge conveyor also aids in helping the discharge of the cooked material from the discharge valve pockets.

Having thus described the preferred embodiments of the invention what is desired to be secured by Letters Patent and claimed as new is:

1. In combination a hollow body in which a pressure may be maintained, a feed valve having a plurality of material receiving compartments and adapted to pass materials continuously into said body without substantially varying the degree of pressure maintained therein except for pressure losses due to gases discharged through said valve compartments; an inclosed conveyor for carrying uncooked materials to said feed valve; a discharge valve having a plurality of material receiving compartments and adapted to continuously withdraw materials from said body without substantially varying the degree of pressure maintained therein except for pressure losses due to gases discharged through said valve compartments; means for continuously conveying materials through said body from said feed valve to said discharge valve; and an inclosed conveyor for carrying said materials away from said discharge valve.

2. In combination a substantially horizontal cooker body adapted to withstand a cooking atmosphere of a pressure substantially different from atmospheric pressure and comprising a feed and discharge opening and means for conveying materials from said feed to said discharge opening; means disposed above said cooker body to feed materials to said cooker body while maintaining a continuous pressure seal comprising a substantially horizontal enclosed conveyor, substantially horizontal enclosed conveyor into which steam escaping from said cooker passes and is utilized to preheat the materials, and means connected to said discharge opening disposed below said cooker body to withdraw materials from said cooker body while mantaining a continuous pressure seal, comprising an enclosed conveyor into which steam escaping from said cooker body is discharged.

3. In combination with a cooker body comprising a feed and discharge opening in which a pressure substantially different from atmospheric pressure may be maintained; conveying means between said feed and discharge opening; feeding means adapted to pass the materials continuously into said cooker while maintaining a substantially horizontal enclosed helical conveyor disposed above said cooker and connected to said feed opening by an enclosed passage; and means adapted to withdraw materials from said cooker body while maintaining a continuous pressure seal, said means being connected to said discharge opening by an enclosed passage and including an enclosed conveyor for carrying said materials away from said cooker body.

4. In combination, a substantially horizontal enclosed feed conveyor; an enclosed gravity cooker feed passage communicating with one end of said feed conveyor body; a substantially horizontal cooker body adapted to withstand pressures substantially different from atmospheric pressure disposed below said feed conveyor, and provided with a feed opening connected to said enclosed gravity feed passage; a discharge opening in said cooker body; conveying means between said feed and said discharge opening; an enclosed gravity discharge passage connected to said discharge opening; and a substantially horizontal discharge conveyor connected to said discharge passage.

Signed at San Jose, Calif., this 31 day of July, 1923.

STANLEY HILLER.